United States Patent
Jothiprakash

(10) Patent No.: US 12,158,828 B1
(45) Date of Patent: Dec. 3, 2024

(54) CORRELATING APPLICATION PERFORMANCE TO EXTERNAL EVENTS

(71) Applicant: Amazon Technologies, Inc., Seattle, WA (US)

(72) Inventor: Sudeeptha Mysore Jothiprakash, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/915,895

(22) Filed: Jun. 29, 2020

(51) Int. Cl.
  *G06F 11/30* (2006.01)
  *G06N 20/00* (2019.01)

(52) U.S. Cl.
  CPC ......... *G06F 11/3072* (2013.01); *G06N 20/00* (2019.01)

(58) Field of Classification Search
  CPC .. G06F 11/3058; G06F 11/3072; G06F 16/34; G06F 16/353; G06F 2201/86
  See application file for complete search history.

(56) References Cited

U.S. PATENT DOCUMENTS

| | | | | |
|---|---|---|---|---|
| 9,843,943 B1* | 12/2017 | Mitchell | | H04L 43/0852 |
| 10,936,462 B1* | 3/2021 | Eardley | | G06F 11/0772 |
| 11,003,773 B1* | 5/2021 | Fang | | G06F 21/552 |
| 2011/0093413 A1* | 4/2011 | Calcaterra | | G06F 11/3409 |
| | | | | 706/11 |
| 2012/0120078 A1* | 5/2012 | Hubbard | | G06F 11/3055 |
| | | | | 345/440.2 |
| 2012/0209568 A1* | 8/2012 | Arndt | | G06F 11/008 |
| | | | | 702/183 |
| 2015/0381409 A1* | 12/2015 | Margalit | | H04L 41/0631 |
| | | | | 709/221 |
| 2016/0036835 A1* | 2/2016 | Lietz | | H04L 63/145 |
| | | | | 726/22 |
| 2016/0364279 A1* | 12/2016 | Brew | | G06F 11/3447 |
| 2018/0063195 A1* | 3/2018 | Nimmagadda | | H04L 63/0263 |
| 2019/0102240 A1* | 4/2019 | Zarrini | | G06F 11/079 |
| 2021/0232535 A1* | 7/2021 | King | | G06F 9/4856 |
| 2022/0157058 A1* | 5/2022 | Raethke | | G06V 10/82 |

* cited by examiner

*Primary Examiner* — Grace Park
(74) *Attorney, Agent, or Firm* — Davis Wright Tremaine LLP

(57) ABSTRACT

A technology is described for correlating application performance to external event types. An example method may include obtaining electronic content from a content server associated with an electronic content provider and extracting a potential reference to an external event from the electronic content, where the external event may impact performance of an application hosted on a computing resources. The reference may be identified as being associated with an external event type using a categorization technique that associates the reference in the electronic content to one or more external event types, and an external event log may be generated to include event data for the external event type to allow correlation of the external event type to performance of the application hosted on the computing resources.

19 Claims, 12 Drawing Sheets

CORRELATING APPLICATION PERFORMANCE TO EXTERNAL EVENTS

BACKGROUND

Present-day computing applications cater to a wide range of users located around the world and provide increasingly customized offerings for different countries, regions, languages, and needs to better provide for user's expectations. These applications may be web applications or cloud applications where a client executes in a web browser and/or includes cloud-based and local components that work together. Common applications include webmail, online retail sales, online banking, online auctions, entertainment, games, etc.

As these applications have become increasingly targeted, efforts have been made to optimize the computing infrastructures that handle application requests received from users who may be located in various locations in the world. The scenario above affects application operators and site reliability engineers (SRE) who may need to troubleshoot issues for applications impacted by external global events, such as sporting events, trends in fashion or gaming, unforeseen natural calamities like hurricanes and earthquakes, as well as many other types of external events. While application operators and SREs can plan for known events by increasing or decreasing computing capacity or scaling an application infrastructure, application operators and SREs may be caught off guard by unforeseen external events, leading to a sub-optimal experience for users of the applications and may even result in a failure in the application infrastructure.

DETAILED DESCRIPTION

Figure 1:
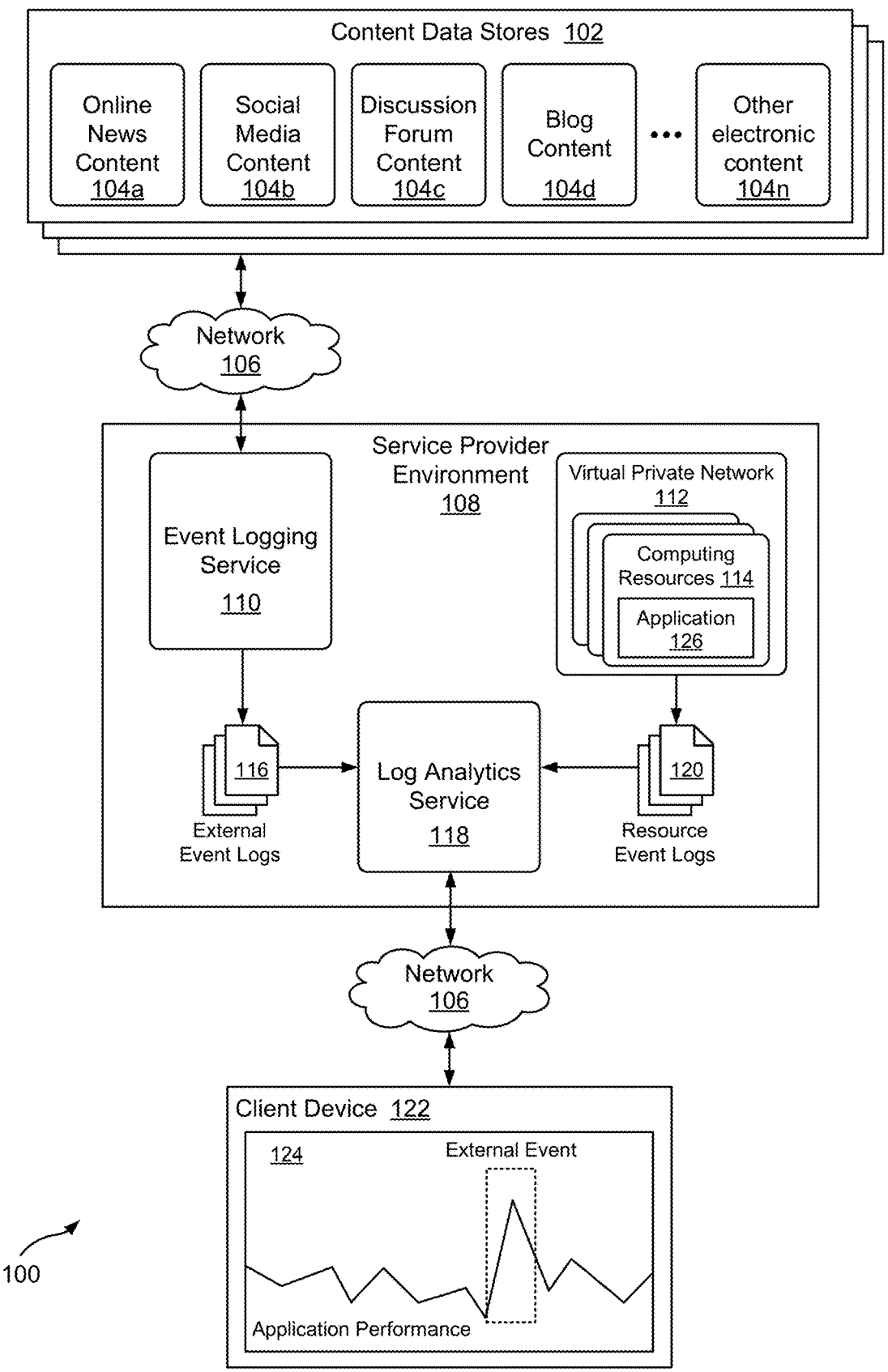
FIG. 1 is a block diagram illustrating an example system for correlating external events to application performance.

A technology is described for correlating application performance to external events that potentially impact the performance of an application. In one example, electronic content containing one or more references to external events may be obtained from electronic content providers that publish electronic content to the internet and provide electronic content repositories and electronic content feeds to subscribers. Electronic content obtained from the electronic content providers may include, for example, news articles, social media postings, discussion forum postings, blog postings, shared video, academic papers, as well as other types of electronic content that may contain references to external events that occur outside of a system that is managing performance of an application. In one example, a customer (e.g., an administrator of an application hosted in a service provider environment) may select which types of electronic content (e.g., social media posts, news articles, etc.) to obtain from the electronic content providers. An external event may be an event that is referenced in electronic content and potentially impacts the health and performance of an application, such as a web application or cloud application hosted in a service provider environment (e.g., a public cloud environment). Illustratively, external events referenced in electronic content may include, but are not limited to, public events, political events, social trends, financial events and trends, natural disasters, natural phenomena, community disturbances, and other types of events.

Electronic content obtained from an electronic content provider may be analyzed to determine whether the electronic content contains a reference to an external event. For example, the electronic content may be converted from an unstructured data format to a structured data format using an information extraction and formatting technique and the structured content data may be analyzed for a reference to an external event. If a reference to an external event is identified, the reference may be classified as being associated with an external event type (e.g., basketball game, concert, online movie release, earthquake, etc.) using a classification technique. For example, a machine learning model trained to associate references to external event types may be used to categorize or classify the reference as being associated with an external event type.

After categorizing or classifying the reference as being associated with the external event type, an external event log may be created for the external event. The external event log may include event data that indicates the type of external event, a time period of the external event, as well as information related to the external event, such as a geographic location of the event, a date and time of the event, and other information which may be useful to a customer in evaluating an impact of the external event on performance of an application. In one example, the event data in the external event logs may be used to generate external event metrics or measurements for the external event. For example, the external event logs may identify how much or how often this specific event is referenced in the electronic content or electronic media. Illustratively, external event metrics may include: a total number of references to an actual (real-world) event or trend, a number of references to the actual event or trend within a geographical region, a number of references to the actual event or trend made on a particular media platform, how often the actual event or trend is referenced, a number of positive and/or negative references to the actual event or trend, and the like. The external event metrics may provide data points that can be used to evaluate a relationship between an external event (e.g., an external event type or a specific occurrence of an external event) and application performance, and/or provide additional information or context for the external event.

An external event log for an external event may be juxtaposed with or overlaid onto a computing resource log for an application to view an impact of the external event on performance of the application. More specifically, external event metrics may be obtained from external event logs and the external event metrics may be viewed in relation to computing performance metrics obtained from computing resource logs. The external event metrics may be provided as time-series data or external event annotations that overlay computing performance metrics, providing a visual representation (e.g., a graph) that enables a customer to identify a correlation between the external event and the performance of the application (e.g., an increase or decrease in a processing load and/or response latency). In one example, the present technology may detect a correlation between an external event and application performance and send a notification to a customer providing information about the external event.

In one example, a data stream of external event logs may be generated from electronic content and the data stream of external event logs can be viewed in relation to application performance in near real-time to enable a customer to view an impact of an external event on application performance while the external event is happening or shortly after the occurrence of the external event. Also, a customer may filter event metadata to limit external event metrics to, for example, a specific event category, event location, event date or time range, and the like. After correlating an external event to application performance, a customer or machine learning model may predict an impact of subsequent external events on application performance and scale computing resources used to host the application based in part on the predicted impact of the external events on the performance of the application.

Prior to the present technology, it was difficult to correlate external events to application performance. In the past application administrators may have been caught off guard by external events which may appear to be unrelated to application performance without numerical analysis. The present technology provides tools to numerically correlate an external event to application performance, allowing an application administrator to anticipate the impact of the external event on the application and to proactively scale computing resources according to the anticipated impact of the external event on the application. More specifically, the present technology may be used to identify references to external events in electronic content and generate external event logs containing event data that can be viewed in relation to computing performance data to enable an application administrator to correlate the external events to performance of an application.

To further describe the present technology, examples are now provided with reference to the figures. FIG. 1 is a diagram illustrating a high-level example of a system 100 for correlating external events to application performance. The system 100 may include a number of components and services configured to obtain electronic content from a plurality of content data stores 102 and generate external event logs 116 containing event data which may be viewed in relation to computing performance data contained in resource logs 120 to allow correlation of an external event to performance of an application hosted on one or more computing resources 114. The computing resources 114 used to execute an application 126 may include computing hardware and software, including various virtualized service resources.

As illustrated, the system 100 may include an external event logging service 110 configured to identify references to external events contained in electronic content and create external event logs 116 for the external events. In one example, the event logging service 110 may obtain electronic content from content data stores 102 associated with electronic content providers. The electronic content may include various types of content (e.g., news content 104a, social media content 104b, discussion forum content 104c, blog content 104d and other types of electronic and online content 104n) provided by various electronic content providers (e.g., news publishers, news aggregators, social media companies, blog hosts, discussion forum hosts, and other electronic content providers). The event logging service 110 may be configured to periodically connect to content data stores 102 and obtain electronic content hosted on the content data stores 102. For example, the event logging service 110 may copy web pages or files containing electronic content, or perform data scraping to extract electronic content from the web pages.

In one example, customers of the event logging service 110 may be provided with the ability to select electronic content to monitor for references to external events. The customers may indicate a level of granularity used to monitor the electronic content. For example, a customer may choose to monitor a broad range of electronic content types (news, social media, discussion forums, blogs, etc.) for references to external events, or a customer may select individual electronic content providers (e.g., a news outlet, a social media account, a discussion forum thread or topic, etc.) to monitor for references to external events. In addition to selecting electronic content to monitor for external events, customers of the event logging service 110 may be provided with the ability to specify one or more external event types that the customer would like to monitor via the electronic content. For example, a customer may choose from defined event types, such as: public events, political events and trends, social events and trends, financial events and trends, commercial events, natural disasters, natural phenomena, community disturbances, and other types of external events. In one example, a customer may specify a particular event which the customer would like to monitor via electronic content, such as a release of a particular online movie, product, or story. The event logging service 110 may obtain the electronic content from content data stores 102 specified by the customers of the event logging service 110.

In one example, a volume of electronic content may be created to include electronic content collected from electronic content providers. The volume of electronic content may be offered to customers (e.g., application administrators) of the event logging service 110 to enable the customers to correlate external events referenced in the electronic content to performance of the customers' applications 126. In one example, the volume may contain electronic content obtained from electronic content providers determined to be most relevant within an online community. For example, due to the large amount of electronic content published electronically or to the internet, it may not be practicable to collect electronic content from every possible source of electronic content. Accordingly, electronic content providers may be ranked based on a reputation of the electronic content providers for particular topics and the event logging service 110 may obtain electronic content from the top ranked electronic content providers.

The event logging service 110 may process electronic content obtained via network 106 from the content data stores 102 and convert the electronic content into a structured data format that allows the electronic content to be analyzed for references to external events. In one example, the event logging service 110 may use text analysis to create structured data by parsing unstructured text in electronic content and extracting machine-readable facts from the text of the electronic content. For example, electronic content may contain unstructured text comprising written content that lacks metadata and cannot readily be indexed or mapped onto standard database fields. This unstructured text may be user-generated information containing references to external events. As an example, a social media posting may contain a reference to a social trend, a news article may contain a reference to a political event, and a discussion forum posting may contain a reference to public event. The event logging service 110 may generate structured data from the unstructured text of the electronic content so that the structured data can be analyzed to determine whether the structured data includes a reference to an external event. In the case that the electronic content is video or audio, a speech-to-text tool or service may be used to generate text from the video or audio, and text analysis can be used to generate structured data from the text extracted from the video or audio. Also, in the case that electronic content comprises an image without provided context, an image recognition tool or service may be used to generate image context that includes text which can be analyzed to determine whether the image includes a reference to an external event.

After electronic content has been converted to structured content data, the event logging service 110 may analyze the structured content data to determine whether the structured content data contains a reference to an external event. In one example, the event logging service 110 may use a classification technique to classify a reference as being associated with an external event (e.g., an external content type or a specific occurrence of an external event). As described above, a customer of the event logging service 110 may specify parameters used to classify references as being associated with an external event type or to a specific external event. Accordingly, based on the customer parameters, the event logging service 110 may classify a reference as being associated with a type of external event (e.g., sporting event) and/or as being associated with a specific event (e.g., a specific occurrence of a professional football game).

In one example, a machine learning model trained to associate a reference contained in electronic content data to an external event may be used by the event logging service 110. For example, as part of converting electronic content to structured content data, the electronic content may be annotated and formatted with one or more labels describing the electronic content and/or the context of the electronic content. A training dataset of labeled electronic content may be created and the training dataset can be used to train a machine learning model to associate references to external events. As described in greater detail later, in one configuration of the system 100, an automated machine learning service may be used to label electronic content data and train a machine learning model using a training dataset of electronic content data. As will be appreciated, any type of machine learning may be used, including supervised and unsupervised machine learning. As an example, classification algorithms such as, artificial neural networks, decision trees, and ensemble learning may be used. After training a machine learning model, electronic content data may be input to the machine learning model and the machine learning model may identify references to external events or external event types contained in the electronic content data and classify the references as being associated with external events or external event types.

The event logging service 110 may generate external event logs 116 for electronic content that has been classified as being associated with external events. In one example, the event logging service 110 may create an external event log 116 by obtaining event data for an external event from electronic content, which as described above, may be structured content data which has been annotated to describe the electronic content. The event logging service 110 may extract event data associated with the external event from the electronic content data and include the event data in the external event log 116. Extracting event data from electronic content data may include one or more of: parsing the electronic content to identify event data via analyzing syntax and semantic aspects in the text of the electronic content; tokenization where the electronic content is divided into multiple sentences which are converted into a sequence of tokens; part-of-speech tagging used to identify word categories, such as content words and functional words; ontology lookup; semantic role labeling that to identifies events (e.g., word groups) and their relationship to other event groups; concept discovery using chunking (chunks of grammatical phrases), key-phrase extraction, and/or topic modeling; or any other technique for obtaining event data about an external event from the electronic content data. Illustratively, the event data which can be included in the external event log 116 may include: an event type or topic (e.g. sporting event), an event identifier (e.g., a specific occurrence of a professional tennis match), an event time period (e.g., a date and time, or a date/time range), a number of electronic references found for the event, and other event information (e.g., a geographic location of the event, event sponsor, estimated crowd attendance, event cost information, etc.). External event logs 116 generated by the event logging service 110 may be made available to a log analytics service 118 used to analyze and visualize log data. In one example, the event logging service 110 may provide customers with an electronic content stream of external event logs 116 to allow the customers to view external event information in relation to application performance in near real-time using the log analytics service 118 described below. The stream of external event logs 116 allows the customers to gauge an impact of an external event on application performance while the external event is happening or shortly after the external event has occurred.

Customers of the event logging service 110 may view event data contained in external event logs 116 in relation to performance of the customer's applications 126 executed on the customer's computing resources 114. In one example, a customer's application 126 may be hosted in a virtual private network 112 or virtual private cloud ("VPC") that includes computing resources 114 used to host the customer's applications 126. The virtual private network 112 may use on-demand configurable pools of shared computing resources allocated within the service provider environment 108 and provide a level of isolation between virtual private networks 112. One or more agents located on the computing resources 114 may monitor the computing resources 114 and generate resource event logs 120. The resource event logs 120 may contain computing performance data for the customer's computing resources 114. Illustratively, the computing performance data contained in the resource event logs 120 may include: a resource identifier, a timestamp, CPU metrics, memory metrics, storage metrics, network metrics, error types, error descriptions, transactions serviced, electronic pages sent, and other computing performance data. The resource event logs 120 for the customer's computing resources 114 may be made available to the log analytics service 118 described below to allow the resource event logs 120 to be analyzed and visualized in association with external event logs 116.

Customers may use the log analytics service 118 to analyze and visualize log data. For example, the log analytics service 118 may allow customers to visualize performance of applications 126 and visualize the use of the computing resources 114 that host the applications 126 using resource event logs 120. The log analytics service 118, in one example, may use log data to provide a customer with a unified view of a flow of events (e.g., computing events and external events) ordered by time. Resource event logs 120 associated with the customer's systems, applications 126, and computing resources 114 may be stored to a central location and the log analytics service 118 may obtain data from the resource event logs 120 and allow a customer to query and sort the log data based on dimensions, group the log data by specific fields, create custom computations from the log data using a query language, and visualize the log data in a dashboard. As an illustration, a resource event log 120 may be created to record an activity or event of a monitored application 126 or computing resource 114. The resource event log 120 may contain properties that include a timestamp of when the event occurred and event message data. The log analytics service 118 may use metric filters to extract metric observations from ingested resource event logs 120 and transform them to data points included in a metric visualization displayed in a dashboard. In one example, resource event logs 120 may be used to generate a resource event log stream comprising a sequence of resource events that share a same source (e.g., an application 126 and/or computing resources 114). The resource event log stream may represent a sequence of events coming from monitored applications 126 and/or computing resources 114. In one example, the log analytics service 118 may be a managed service provided by a computing service provider to customers of the computing service provider.

Customers may use the log analytics service 118 to correlate performance of customer applications 126 to external events recorded in electronic content. As described earlier, a customer may select electronic content to monitor for references to an external event and external event logs 116 may be created from the electronic content. The customer may use the log analytics service 118 to view the external event logs 116 in relation to the customer's resource event logs 120. More specifically, the log analytics service 118 may generate a metrics visualization 124 of application performance metrics obtained from the external event logs 116 and external event metrics obtained from the resource event logs 120. The metrics visualization 124 may be shown in a dashboard displayed on a client device 122. Illustratively, the metrics visualization 124 can be a graph or chart, such as: a bar chart, bar line, histogram, scatterplot, streamgraph, treemap, Gantt chart, heat map, time series graph, bubble chart, bullet chart, single value chart, three dimensional graph or visualization, and the like. The metrics visualization 124 may juxtapose the application performance data with the external event metrics to enable a customer to draw conclusions between application performance and the occurrence of the external event.

Figure 2A:
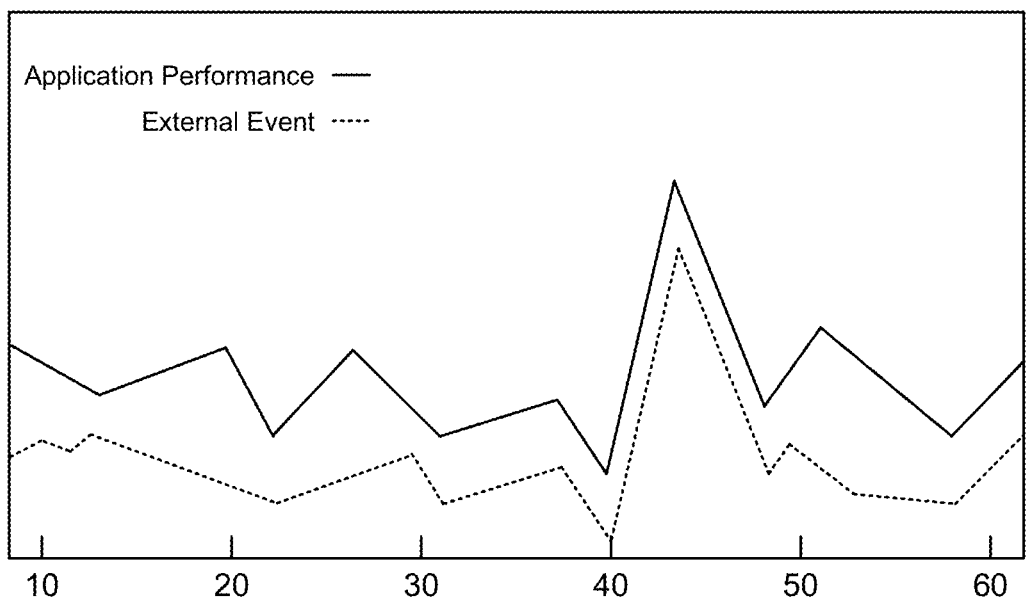
FIGS. 2A-2E are diagrams that illustrate various metrics visualizations used to view external event metrics in relation to application performance metrics.
Figure 2B:
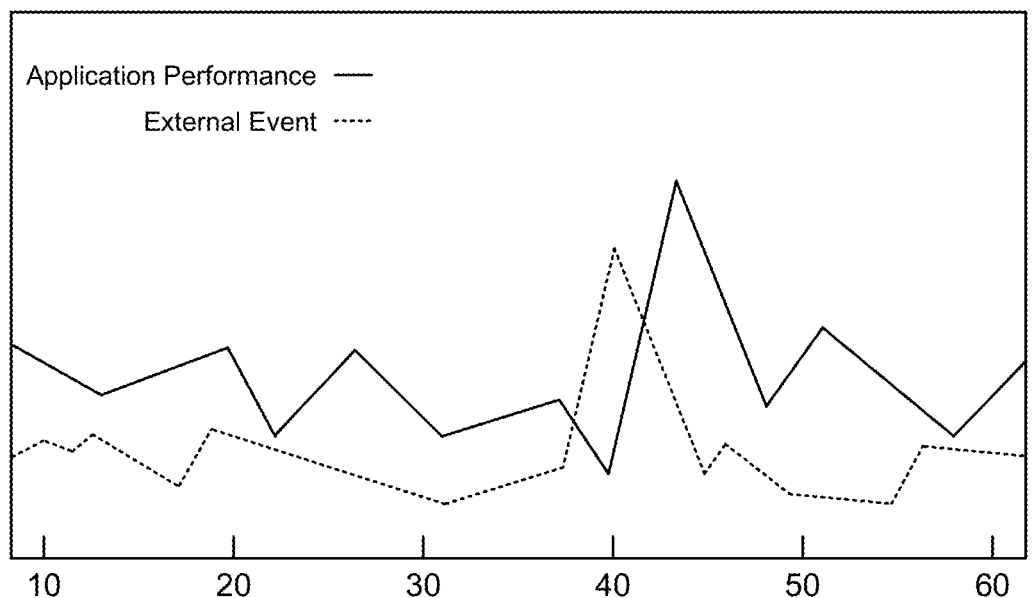
Figure 2C:
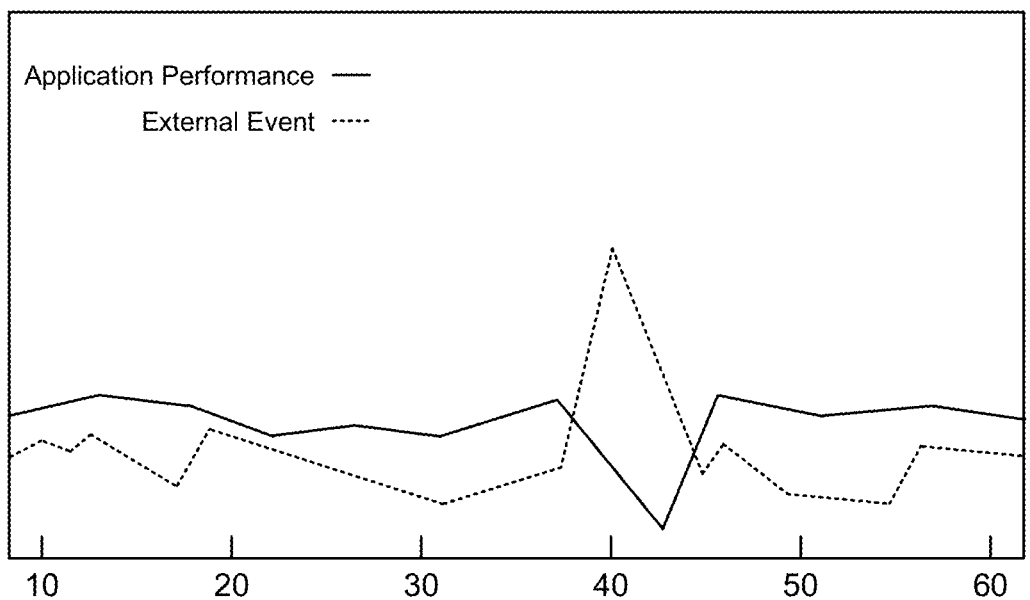

In one example illustrated in FIG. 2A, a metrics visualization may overlay external event metrics on application performance metrics, allowing a customer to observe instances where spikes in application performance correspond to spikes of external events. For example, application performance metrics may be visualized as time-series data and event metrics may be overlaid on the application performance metrics as time-series data to allow a time correlation between application performance and an external event. In one example, as illustrated in FIG. 2B, an overlay of external event metrics on application performance metrics may indicate a spike in external events that precede a spike in application performance. The spike in external events may occur close in time (e.g., within minutes or hours) to the change in application performance providing a presumption that the change in application performance is linked to the external event. Also, a pattern of external event activity that closely precedes a change in application performance may indicate that the external event activity is linked to the change in application performance. As illustrated in FIG. 2C, an overlay of external event metrics on application performance metrics may indicate a decrease in application performance which may be linked to an increase in external events. As an example, a sporting event may be linked to a decreased load on a video streaming application.

Figure 2D:
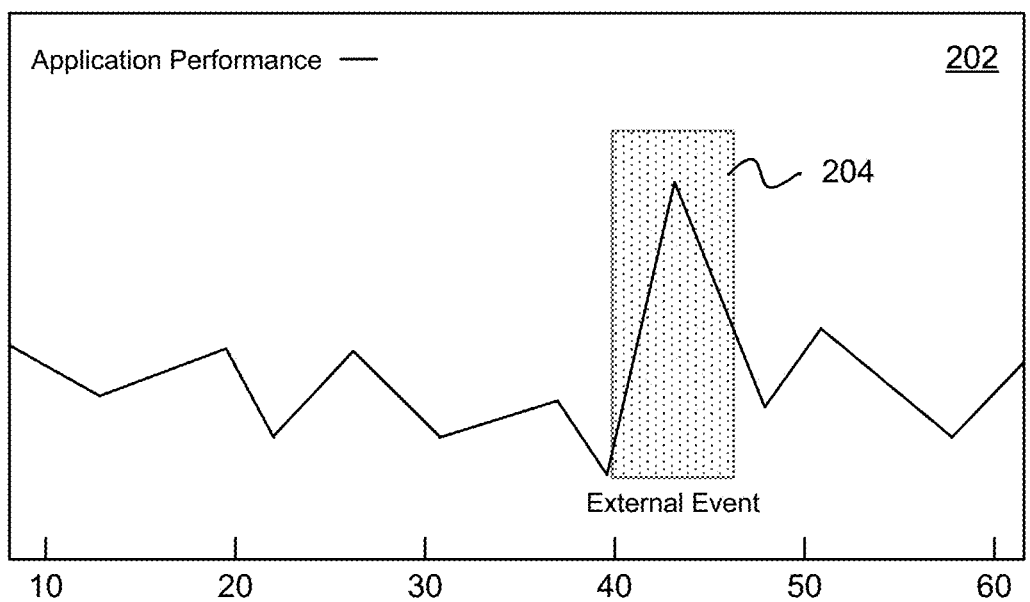
Figure 2E:
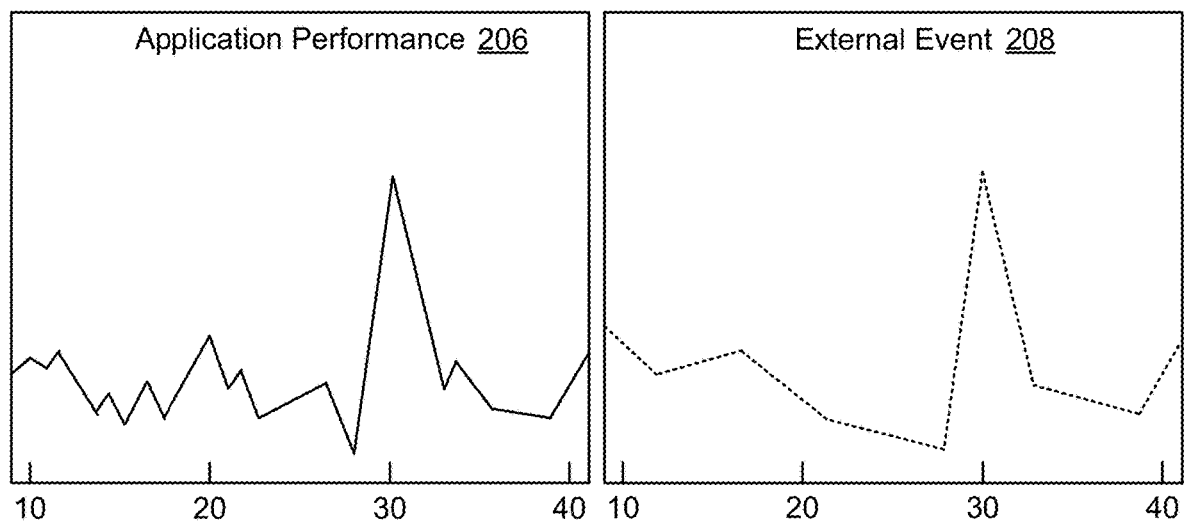

In another example illustrated in FIG. 2D, a metrics visualization 202 of application performance may be annotated with an external event annotation 204. For example, the log analytics service described earlier may generate a metrics visualization showing application performance metrics as time-series data annotated by the analytics service to indicate a time when an external event occurred in respect to application performance. For example, a time period associated with a reference to an external event can be correlated to time-series application performance data, and an external event annotation 204 can be added to a metrics visualization 202. In yet another example illustrated in FIG. 2E, a metrics visualization may be generated to display application performance metrics 206 in proximity to external event metrics 208 to allow a customer to compare the application performance metrics 206 next to the external event metrics 208. While FIGS. 2A-2E illustrate examples of metrics visualizations which may be used to compare application performance metrics with external event metrics, many other similar or different types and configurations of visualizations are possible. The example metrics visualizations discussed and illustrated above are merely representative and not limiting.

Returning to FIG. 1, in one example, the log analytics service 118 may identify a correlation between application performance and the occurrence of an external event and send a notification to a customer providing information about the correlation. For example, the log analytics service 118 may be configured to analyze an overlay of application performance metrics and external event metrics and detect a rise or fall in application performance that correlates to an external event. As an example, the log analytics service 118 may identify a spike (e.g., a rising edge or positive edge) in application performance and correlate the spike to an external event. Also, the log analytics service 118 may analyze historical log data to identify patterns of external events which impact application performance. The patterns may indicate seasonality of the external events (e.g., repeating group events, day of year, etc.) and identify a predictable cyclic variation of application performance which can be correlated to the seasonality of the external events. In response to identifying a correlation between application performance and an external event, the log analytics service 118 may send a notification to a customer containing information related to the identified correlation between application performance and the external event. The notification may allow the customer to perform an action, such as scaling of computing resources, and may enable the customer to plan ahead for future instances of the external event.

Figure 3:
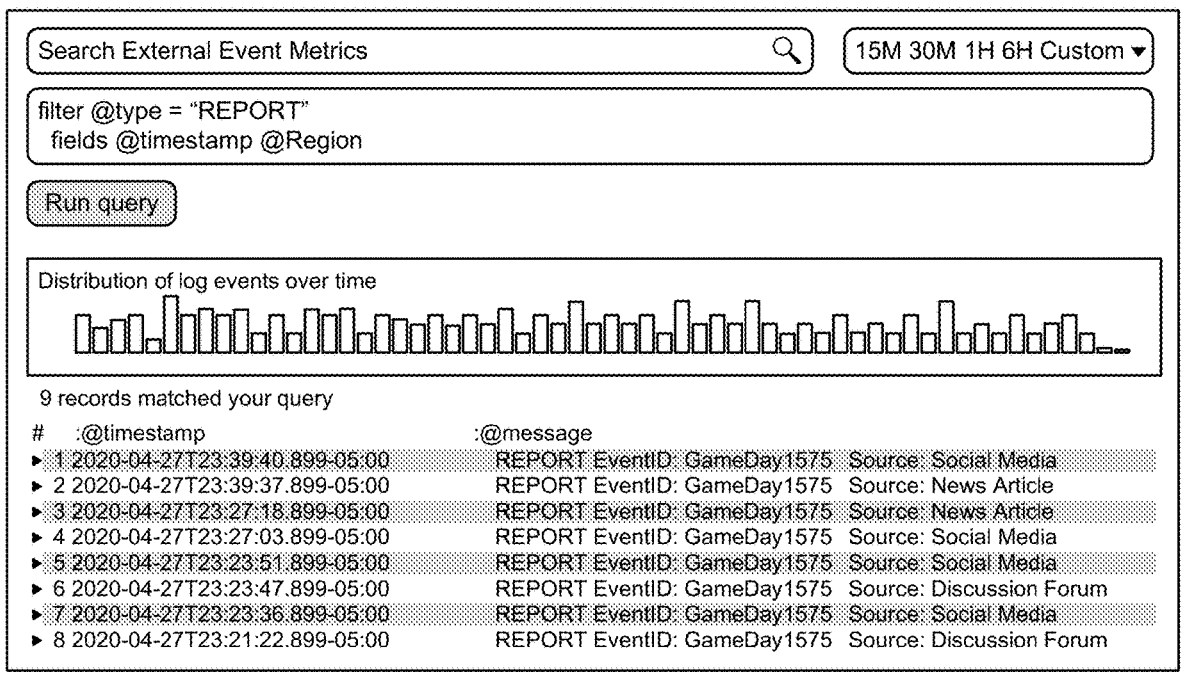
FIG. 3 is a diagram illustrating a user interface for querying and searching event logs containing event metrics which may be viewed in relation to application performance metrics.

FIG. 3 is a diagram illustrating an example user interface 300 for querying and searching event logs containing event metrics which may be viewed in relation to application performance metrics. As described earlier, customers may select electronic content sources for which the customers are interested in curating electronic content which contains possible references to external events, and external event logs may be generated from the electronic content. Thereafter, customers may filter external event logs based on metadata of interest, such as event region, event type, and event time period, and configure which type of output to include in a metric visualization, such as external event annotations (e.g., as shown in FIG. 2B) or time series metrics (e.g., as shown in FIG. 2A). As a non-limiting example, a customer may filter external event logs based on a specific sporting event and limit the external event logs to a specific geographic region.

In one example, custom external event metrics may be calculated from event data contained in external event logs and the custom external event metrics can be written back to the external event logs to make the custom event metrics available for filtering in the external event logs. For example, the log analytics service described earlier may be configured to ingest complex high-cardinality event data obtained from external event logs and generate custom external event metrics from the event data. The log analytics service may then embed the custom external event metrics alongside other event data in the external event logs. Thereafter, the log analytics service may automatically extract the custom external event metrics from the external event logs and generate a metrics visualization to include the custom external event metrics and computing resource event metrics. Also, the custom external event metrics can be queried to provide insights into application performance in view of external events. As an illustration, customers may provide filter parameters to the user interface 300 used to identify external event logs that have embedded custom external event metrics and the custom external event metrics may be retrieved from a set of external event logs and provided to the user interface 300 to allow the custom external event metrics to be viewed in relation to computing performance metrics for computing resources used to execute a customer's application.

Figure 4:
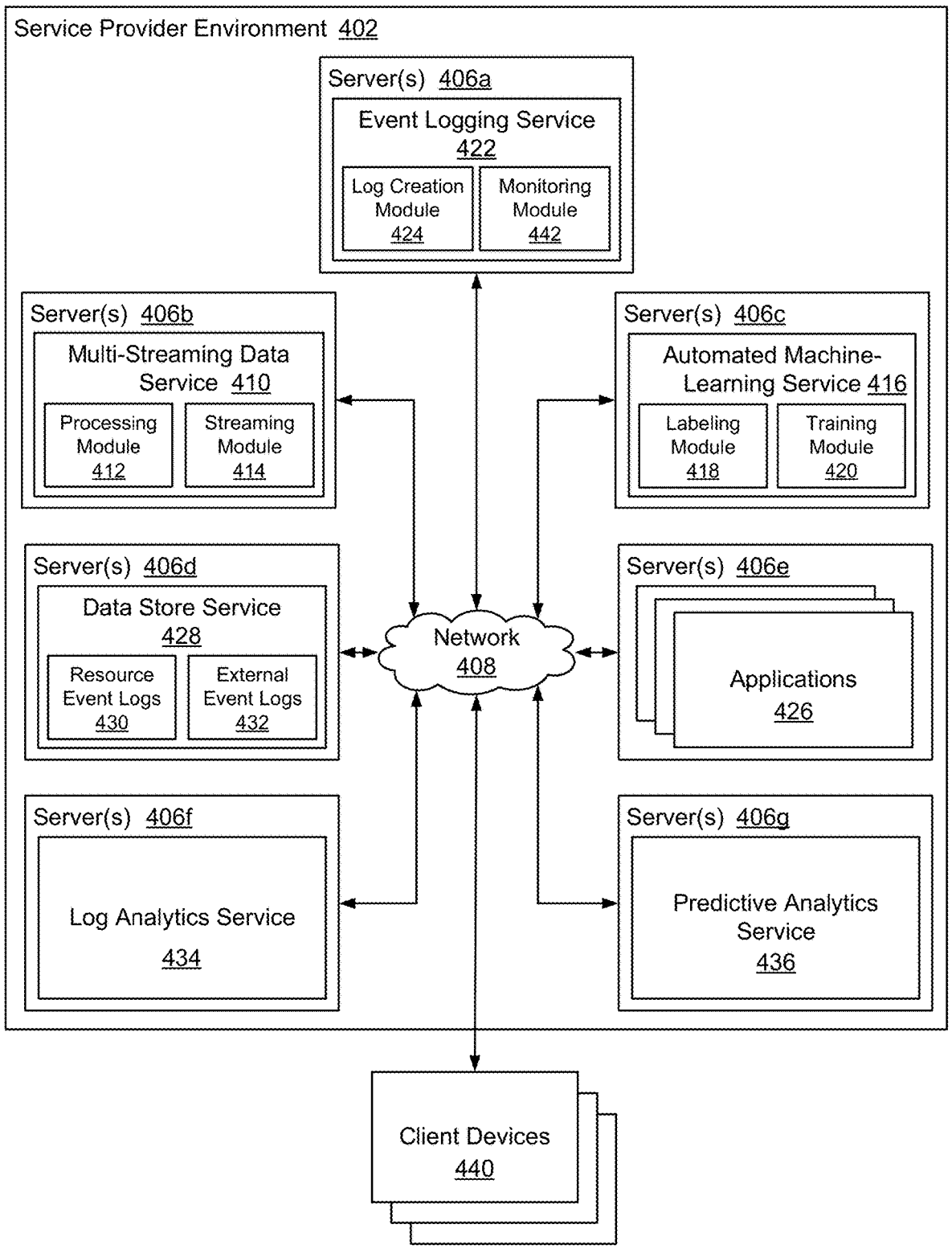
FIG. 4 a block diagram that illustrates an example system environment on which the present technology may be executed.

FIG. 4 is a block diagram that illustrates an example system environment 400 on which the present technology may be executed. The system environment 400 may include a plurality of servers 406a-g located in a service provider environment 402 which may be in network communication via a computer network 408. The servers 406a-g may host various services used to collect electronic content from content servers, generate external event logs 432 from the electronic content, and correlate external event metrics to application performance metrics. The service provider environment 402 is described in more detail later in association with FIG. 7.

As illustrated, one or more servers 406a may host an event logging service 422. The event logging service 422 may provide services associated with obtaining electronic content from electronic content providers and analyzing the electronic content for references to external events. Electronic content may be unstructured text obtained from news articles, social media postings, discussion forum postings, blogs, data repositories, a data stream, a data subscription, and other types of electronic content. The event logging service 422 may be accessible to customers via a management console or another type of user interface. The event logging service 422, in one example, may be a managed service provided to customers of a computing service provider. The customers may use the event logging service 422 to analyze electronic content for references to external events and determine whether the external events have an impact on the performance of the customer's applications 426.

In one example, the event logging service 422 may monitor electronic content for references to external events (e.g., external event types and/or specific external events) and generate external event logs 432 from electronic content containing references to the external events. Customers of the event logging service 422 may provide specifications for electronic content, electronic media and external events to monitor, and the event logging service 422 may monitor the electronic content using the customer specifications and generate external event logs 432 for electronic content containing references to the external events. In one example configuration, the event logging service 422 may include a monitoring module 442 configured to monitor electronic content based on specifications for electronic content and external events obtained from a monitoring profile. The monitoring module 442 may be configured to receive customer specifications for electronic content (e.g., electronic content types and/or electronic content sources) and external events (e.g., external event types and/or external event instances) and create a monitoring profile based on the customer specifications. The monitoring module 442 may use the monitoring profile to obtain electronic content from the electronic content providers specified in the monitoring profile and analyze the electronic content for references to the external events specified in the monitoring profile. The monitoring module 442 may be configured to process electronic content into a structured data format that allows the electronic content to be analyzed for a reference to an external event.

In one example, a multi-streaming data service 410 may be used to stream electronic content obtained from electronic content providers in parallel to multiple subscribing instances of the event logging service 422. For example, a customer account may be provided with an instance of the event logging service 422. The multi-streaming data service 410 may be used to provide a data stream of electronic content to each instance of the event logging service 422 created for customer accounts. The multi-streaming data service 410 may use monitoring profiles for the customer accounts to identify electronic content to send to an instance of the event logging service 422. In one example configuration, the multi-streaming data service 410 may include a processing module 412 configured to process electronic content into a structured data format that allows the electronic content to be analyzed for a reference to an external event. After processing, the electronic content may be provided to a streaming module 414 configured to send the electronic content to instances of the event logging service 422 associated with various customer accounts.

As described above, the event logging service 422 may include a monitoring module 442. The monitoring module 442 may be configured to analyze electronic content that has been converted into a structured data format and identify references to external events contained in the electronic content. In one example configuration, the monitoring module 442 may use a categorization technique to associate a reference in electronic content with one or more external event types. Any appropriate categorization technique may be used, including connectivity-based clustering, centroid-based clustering, distribution-based clustering, density-based clustering, grid-based clustering, heuristic classification, ontology classification, and other types of categorization algorithms. In another example configuration, the monitoring module 442 may use a machine learning model trained to identify references contained in electronic content as being associated with an external event (e.g., an external event type and/or a specific external event). The machine learning model, in one example, may be trained and deployed using an automated machine-learning service 416. For example, the system 400 may include an automated machine-learning service 416 that obtains a labeled training dataset of electronic content, trains a machine learning model to classify references contained in electronic content using the training dataset, and deploys the machine learning model for use by other services. The automated machine-learning service may be a managed service which is provided to customers of a computing service provider. The automated machine-learning service 416 may include a labeling module 418, a training module 420, and other modules. The labeling module 418 may be configured to provide automated data labeling of an electronic content training dataset using machine learning. For example, a portion of the electronic content dataset may be manually labeled and used to train a machine learning model to label a remaining portion of the electronic content dataset. The trained machine learning model can then be used to label the remaining portion of the dataset along with any needed limited human assistance. The training module 420 may be configured to provide automated training of a machine learning model using the electronic content training dataset. After the machine leaning model has been trained, the automated machine-learning service 416 may deploy the machine learning model for use by the event logging service 422.

The monitoring module 442 may be configured to flag electronic content that has been identified as containing a reference to an external event and send the electronic content to a log creation module 424 included in the event logging service 422. The log creation module 424 may be configured to generate external event logs 432 from electronic content flagged as containing references to external events. In the example that an instance of electronic content contains separate references to different external events, external event logs 432 may be created for each external event referenced in the electronic content. An external event log 432 generated by the log creation module 424 may contain time period data and event data for the external event. The time period data may be used to correlate the external event to computing resource events. The external event logs 432 generated by the log creation module 424 may be stored using a data store service 428 which makes logs available to a log analytics service 434 described below. In one example, an instance of the data store service 428 may be created for an individual customer account to provide storage services associated with the customer's services and applications 426. Event logs, including resource event logs 430 and external event logs 432 created for a customer account may be stored to a log data store associated with the customer account and managed using an instance of the data store service 428 created for the customer account. Resource event logs 430 managed by the data store service 428 may contain computing performance data for applications 426 and computing resources associated with the customer account.

In another example, the event logging service 422 may be used to generate a volume of external event logs 432 containing references that have been classified as being associated with external events, and the volume of external event logs 432 can be made available to customers of a computing service provider. The event logging service 422 may obtain electronic content from a plurality of electronic content providers and analyze the electronic content for references to external events. In one example, the electronic content may be obtained from electronic content providers determined to be most relevant within a community (e.g., top ranked electronic content providers). External event logs 432 may be generated for electronic content containing references to external events, wherein the references may be tagged as being associated with an external event type and/or a specific external event, and the external event logs 432 may be included in the volume of external event logs 432. The external event logs 432 may be offered to customers of the event logging service 422 who may query the external event logs 432 to identify external event logs 432 associated with an external event and correlate the external event to performance of the customer's applications 426.

The system 400 may include a log analytics service 434 provided to customers who may use the log analytics service 434 to view event data in relation to customer applications and external events. Customers may access the log analytics service 434 using client devices 440. The log analytics service 434 may be configured to obtain log data from resource event logs 430 and external event logs 432 from the data store service 428, and the log analytics service 434 may provide customers with tools to query and sort the log data based on dimensions, group the log data by specific fields, create custom computations from the log data using a query language, and visualize the log data in a dashboard. For example, the log analytics service 434 may use metric filters to extract metrics from resource event logs 430 and external event logs 432 and transform the metrics to data points included in a metric visualization displayed in a dashboard. In one example, transformed metrics extracted from an event log (i.e., a resource event log 430 or external event log 432) may be written back to the event log to allow the transformed metrics to be used as a filter parameter in a future query.

The log analytics service 434 may generate metrics visualizations using event metrics from resource event logs 430 and external event logs 432 that allow customers to associate external events with the performance of the customers' applications 426, as described earlier. In one example, the log analytics service 434 may be provided with an event data stream generated from event metrics obtained from resource event logs 430 and external event logs 432, and the log analytics service 434 may generate a metrics visualization to allow a customer to view the events (e.g., application performance events and external events) represented in the event data stream in near real-time using the log analytics service 434.

In one example, the log analytics service 434 may be configured to identify a correlation between application performance and the occurrence of an external event and send a notification to a customer to provide information about the correlation to the customer. For example, the log analytics service 434 may analyze an overlay of log data from resource event logs 430 associated with an application 426 and external event logs 432 associated with past external events and detect a rise or fall in application performance that correlates to an external event. As part of identifying a correlation between application performance and an external event, the log analytics service 434 may send a notification to a customer containing information related to the effect of the external event on application performance.

In one example, the system 400 may include a predictive analytics service 436 used to predict an impact of an external event on performance of an application 426 hosted on computing resources in the service provider environment 402 and scale the computing resources based in part on the predicted impact of the external event on the performance of the application 426. The impact of an external event on an application 426 may increase or decrease a processing load on the computing resources used to execute the application 426. In one example configuration, the predictive analytics service 436 may use machine learning to predict an impact of an imminent external event on application performance. For example, a machine learning model may be trained using a training dataset comprising log data from resource event logs 430 associated with an application 426 and external event logs 432 associated with past external events. Thereafter, the machine learning model may be deployed for use by the predictive analytics service 436 to predict an impact of an imminent external event on performance of the application 426. In one example, the predictive analytics service 436 may send a notification to a customer containing information regarding the predicted impact of the external event on application performance to allow the customer to proactively scale the customer's computing resources. In another example, the predictive analytics service 436 may proactively scale the customer's computing resources for the application 426 based in part on the predicted impact of the external event.

The various processes and/or other functionality contained within the system 400 may be executed on one or more processors that are in communication with one or more memory modules. The system 400 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the service provider environment 402 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

A customer may use a client device 440 to connect to the service provider environment 402 and access the available services offered by a computing service provider. A client device 440 may include any device capable of sending and receiving data over a network 408, such as, but not limited to, a desktop computer, laptop or notebook computer, tablet computer, mainframe computer system, handheld computer, workstation, network computer, or other devices with like capability. The network 408 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 4 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 4 illustrates an example of a system that may implement the techniques above, many other similar or different environments are possible. The example environments discussed and illustrated above are merely representative and not limiting.

Figure 5:
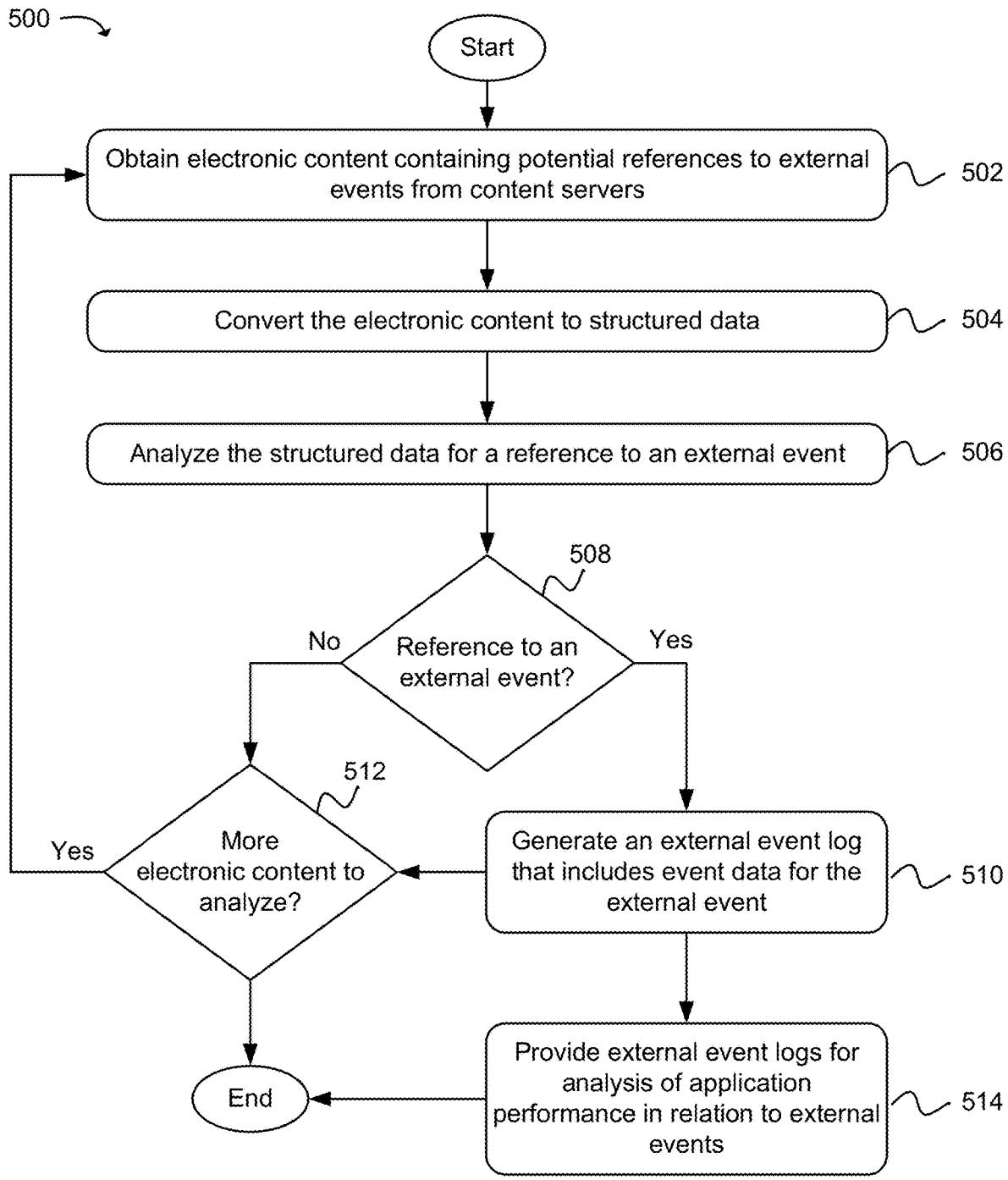
FIG. 5 is a flow diagram illustrating an example method for generating external event logs used to correlate an external event to application performance.

FIG. 5 is a flow diagram illustrating an example method 500 for generating external event logs used to correlate an external event to application performance. As in block 502, electronic content, electronic media, news media, or internet media containing potential references to external events may be obtained from content data stores associated with electronic content providers that publish the electronic content to the internet. The electronic content obtained from the electronic content data stores may include: news articles, social media postings, discussion forum postings, blog postings, shared video, as well as other types of electronic content potentially containing references to external events. In one example, a customer may select the types of electronic content to obtain.

As in block 504, the electronic content obtained from the content data stores may be converted to structured content data. For example, the electronic content may be converted from an unstructured format to a structured data format which allows the electronic content to be analyzed for references to external events (e.g., external event types and/or specific instances of external events). In one example, text analysis may be used to generate structured data from the unstructured electronic content. For example, the electronic content may contain unstructured text comprising written content (e.g., social media posts, news articles, etc.) that lacks metadata used to index or map text to database fields. The unstructured text may be user-generated information containing references to external events. Text analysis may be used to parse and analyze the unstructured text and generate structured content data from the unstructured text. For electronic content comprising video or audio, a speech-to-text tool may be used to generate text from the video or audio, and text analysis can be used to generate structured content data from the text extracted from the video or audio. Also, for electronic content comprising an image without textual context, an image recognition tool or service may be used to generate image context which can be analyzed to determine whether the image includes a reference to an external event.

As described earlier, an external event may be any event referenced in electronic content that potentially impacts the health and performance of an application, such as a web application or cloud application hosted in a service provider environment. Illustratively, external events referenced in electronic content may include: public events, political events, social trends, financial events and trends, natural disasters, natural phenomena, community disturbances, and other types of events.

As in block 506, the structured content data generated from the electronic content may be analyzed to identify a reference to an external event. In cases where electronic content includes a time reference (e.g., publication data or a date linked to a reference to an external event), the time reference can be used to link the reference to a particular instance of an external event (e.g., a past or future baseball game). In one example, machine learning may be used to classify a reference contained in the structured content data as being associated with an instance of an external event. For example, a machine learning model may be trained to associate a reference with an external event. As one example, a training dataset of electronic content with labels may be provided to an automated machine-learning service that trains the machine learning model using the training dataset. The trained machine-learning model may be deployed for use in classifying references contained in electronic content as being associated with an external event type and/or a specific instance of an external event. In other examples, unsupervised machine learning or cluster analysis may be used to associate a reference to an external event.

As in block 508, in the case that the reference in the structured content data is a reference to an external event, then as in block 510, an external event log may be generated to include event data for the external event. The event data may indicate a type of external event, a time period of the external event, as well as information related to the external event, such as a geographic location of the event, a date of the event, and other information which may be useful to a customer in evaluating an impact of the external event on performance of an application. The event data in an external event log may be used to generate external event metrics (e.g., a total number of references to an actual (real-world) event or trend, a number of references to the actual event or trend within a geographical region, a number of references to the actual event or trend made on a particular media platform, how often the actual event or trend is referenced, a number of positive and/or negative references to the actual event or trend, and the like). The event metrics may provide data points used to evaluate a relationship between the external event and application performance, or the event metrics may provide additional information or context for the external event, which may be used to filter event logs. The event metrics, in one example, may be written back to the external event logs to allow filtering of the external event logs using the event metrics.

As in block 512, in the case that there is additional electronic content to be processed, the method 500 may obtain the additional electronic content and generate an external event log for any references in the electronic content to external events. As in block 514, the external event logs may be provided for analysis of application performance in relation to the external events. In one example, a computing performance graph may be generated using computing performance metrics obtained from computing resource logs associated with a customer's computing resources, and external event metrics from the external event logs may be overlaid on the computing performance metrics, allowing the customer to view the external event metrics in relation to the computing performance metrics and correlate application performance to the external event. In another example, computing performance graph may be annotated to indicate an occurrence of the external event in relation to the computing performance of the customer's computing resources. In yet another example, a computing performance graph may be generated for the customer's computing resources, and an external event graph may be generated for the external event, such that the computing performance graph and the external event graph may be displayed adjacent to one another to allow comparison of event metrics to computing performance metrics.

In one example, a customer may filter the external event metrics included in a computing performance graph. For example, the customer may provide filter parameters for the external event metrics and the external event metrics selected by the customer may be displayed in the computing performance graph to allow the external event metrics to be viewed in relation to the computing performance metrics. External event logs generated using the method 500 may be stored to a log data store to make the external event logs available to services used to search and analyze external event data associated with external events.

Figure 6:
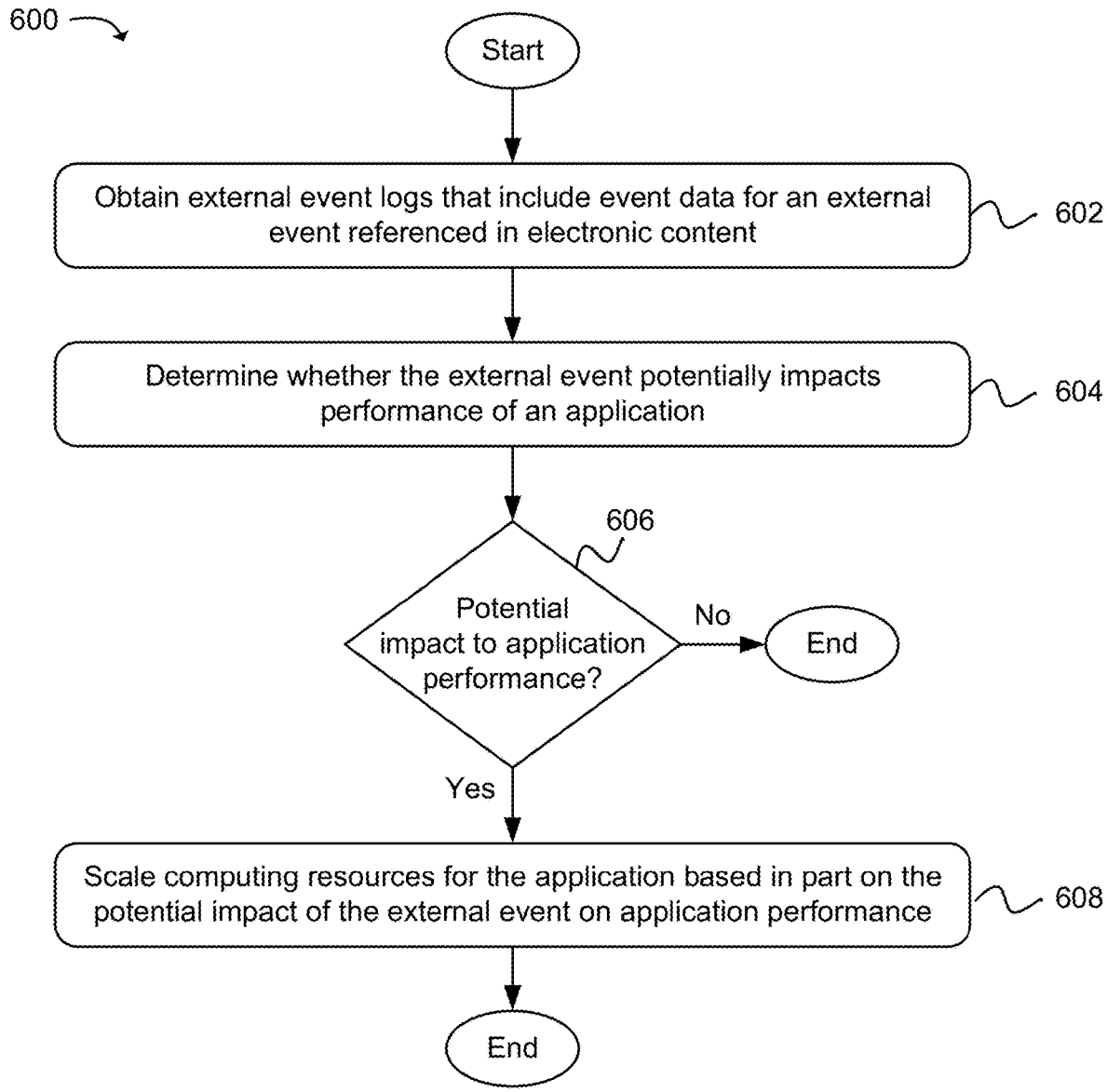
FIG. 6 is a flow diagram that illustrates and example method for managing computing resources based in part on a predicted impact of an external event on the computing resources.

FIG. 6 is a flow diagram that illustrates an example method 600 for managing computing resources based in part on a predicted impact of an external event on the computing resources. As in block 602, external event logs may be obtained which include event data for an external event referenced in electronic content. As described earlier, the external event logs may be generated from electronic content obtained from electronic content providers.

As in block 604, event data in the external event logs may be used to determine whether an imminent external event potentially impacts performance of a customer's application. In one example, predictive analytics may be used to predict an impact of the external event on performance of the application. The predictive analytics may use statistical techniques, such as data mining, predictive modelling, and machine learning, to analyze current and historical external event data and computing resource performance data to make predictions related to application performance. For example, a machine learning model may be trained using a training dataset comprising log data from external event logs associated with monitored external events and computing resource event logs associated with the customer's application. The trained machine learning model may be deployed for use in generating a predicted impact of an imminent external event on the customer's computing resources used to execute the application. A predicted impact output by the machine learning model may indicate a likelihood that the external event will cause a processing load on computing resources to increase or decrease.

As in block 606, in the case that a predicted impact of the imminent external event on application performance indicates that scaling of the computing resources used to execute the application should be performed, then as in block 608, the computing resources may be scaled based in part on the potential impact of the imminent external event on application performance. For example, additional computing resources may be launched when a processing load on the computing resources is predicted to increase, and excess computing resources may be terminated when the processing load is predicted to decrease as a result of the external event. For example, additional computing instances or virtual machines may be launched or additional storage capacity may be brought online.

Figure 7:
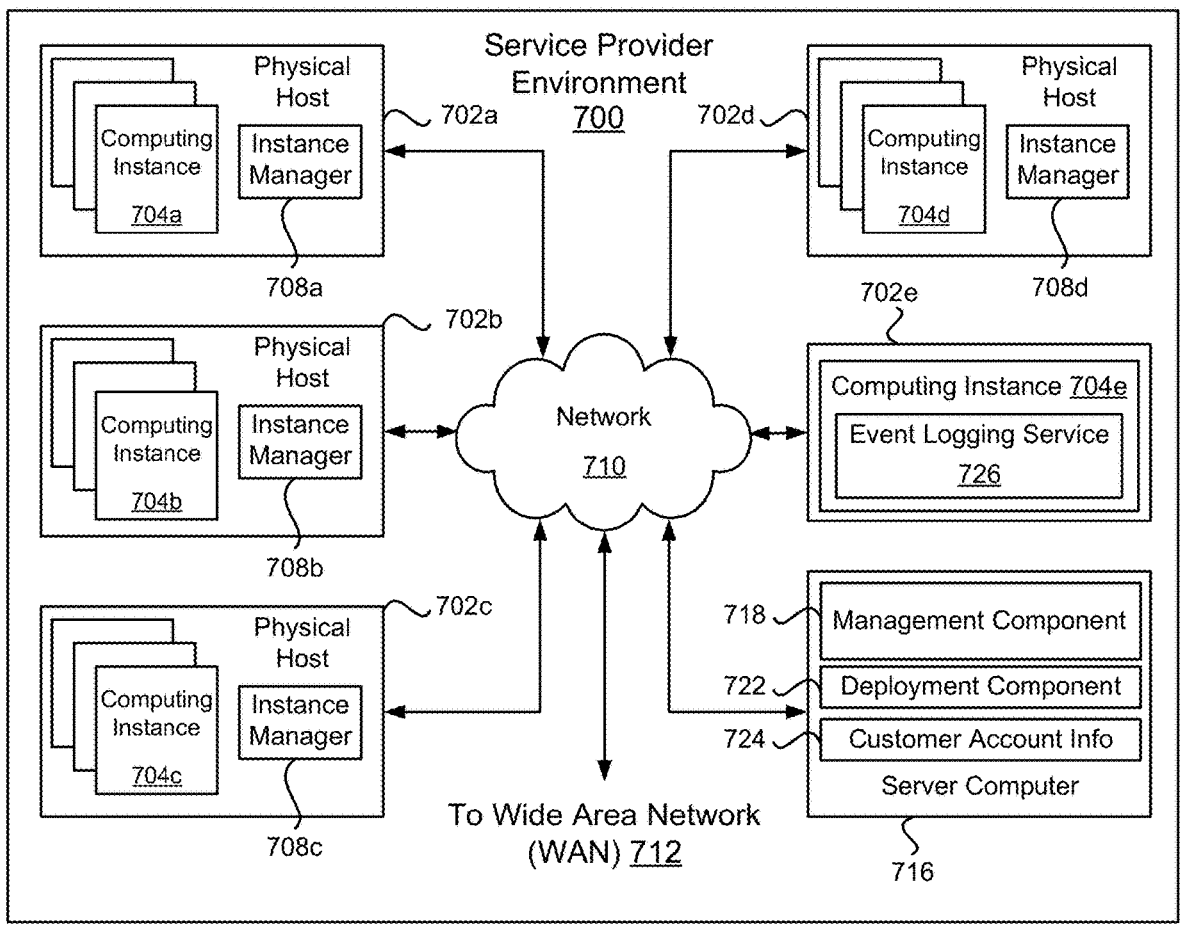
FIG. 7 is a block diagram that illustrates an example service provider environment in which the present technology may be hosted.

FIG. 7 is a block diagram illustrating an example service provider environment 700 which may be used to execute and manage a number of computing instances 704a-e. In particular, the service provider environment 700 depicted illustrates one environment in which the technology described herein may be used. The service provider environment 700 may be one type of environment that includes various virtualized service resources that may be used, for instance, to host computing instances 704a-e.

The service provider environment 700 may be capable of delivery of computing, storage and networking capacity as a software service. In one example, the service provider environment 700 may be established for an organization by or on behalf of the organization. That is, the service provider environment 700 may offer a "private cloud environment." In another example, the service provider environment 700 may support a multi-tenant environment, wherein a plurality of customers may operate independently (i.e., a public cloud environment). Generally speaking, the service provider environment 700 may provide the following models: Infrastructure as a Service ("IaaS"), network-accessible system as a service, and/or Software as a Service ("SaaS"). Other models may be provided. For the IaaS model, the service provider environment 700 may offer computers as physical or virtual machines and other resources. The virtual machines may be run as guests by a hypervisor, as described further below. The network-accessible system as a service model delivers a computing system that may include an operating system, programming language execution environment, database, and web server.

Application developers may develop and run software solutions in the service provider environment 700 without incurring the cost of buying and managing the underlying hardware and software. The SaaS model allows installation and operation of application software in the service provider environment 700. End customers may access the service provider environment 700 using networked client devices, such as desktop computers, laptops, tablets, smartphones, etc. running web browsers or other lightweight client applications, for example. Those familiar with the art will recognize that the service provider environment 700 may be described as a "cloud" environment.

The particularly illustrated service provider environment 700 may include a plurality of server computers 702a-e. While four server computers are shown, any number may be used, and large data centers may include thousands of server computers. The service provider environment 700 may provide computing resources for executing computing instances 704a-e. Computing instances 704a-e may, for example, be virtual machines. A virtual machine may be an instance of a software implementation of a machine (i.e. a computer) that executes applications like a physical machine. In the example of a virtual machine, each of the server computers 702a-e may be configured to execute an instance manager 708a-d capable of executing the instances. The instance manager 708a-d may be a hypervisor, virtual machine monitor (VMM), or another type of program configured to enable the execution of multiple computing instances 704a-e on a single server. Additionally, each of the computing instances 704a-e may be configured to execute one or more applications, including applications providing services managed by a computing service provider. For example, one or more computing instances 704e may execute the event logging service 726 described earlier.

One or more server computers 716 may be reserved to execute software components for managing the operation of the service provider environment 700 and the computing instances 704a-e. For example, a server computer 716 may execute a management component 718. A customer may access the management component 718 to configure various aspects of the operation of the computing instances 704a-e purchased by a customer. For example, the customer may setup computing instances 704a-e and make changes to the configuration of the computing instances 704a-e.

A deployment component 722 may be used to assist customers in the deployment of computing instances 704a-e. The deployment component 722 may have access to account information associated with the computing instances 704a-e, such as the name of an owner of the account, credit card information, country of the owner, etc. The deployment component 722 may receive a configuration from a customer that includes data describing how computing instances 704a-e may be configured. For example, the configuration may include an operating system, provide one or more applications to be installed in computing instances 704a-e, provide scripts and/or other types of code to be executed for configuring computing instances 704a-e, provide cache logic specifying how an application cache should be prepared, and other types of information. The deployment component 722 may utilize the customer-provided configuration and cache logic to configure, prime, and launch computing instances 704a-e. The configuration, cache logic, and other information may be specified by a customer accessing the management component 718 or by providing this information directly to the deployment component 722.

Customer account information 724 may include any desired information associated with a customer of the multi-tenant environment. For example, the customer account information may include a unique identifier for a customer, a customer address, billing information, licensing information, customization parameters for launching instances, scheduling information, etc. As described above, the customer account information 724 may also include security information used in encryption of asynchronous responses to API requests. By "asynchronous" it is meant that the API response may be made at any time after the initial request and with a different network connection.

A network 710 may be utilized to interconnect the service provider environment 700 and the server computers 702a-e, 716. The network 710 may be a local area network (LAN) and may be connected to a Wide Area Network (WAN) 712 or the Internet, so that end customers may access the service provider environment 700. The network topology illustrated in FIG. 7 has been simplified, many more networks and networking devices may be utilized to interconnect the various computing systems disclosed herein.

Figure 8:
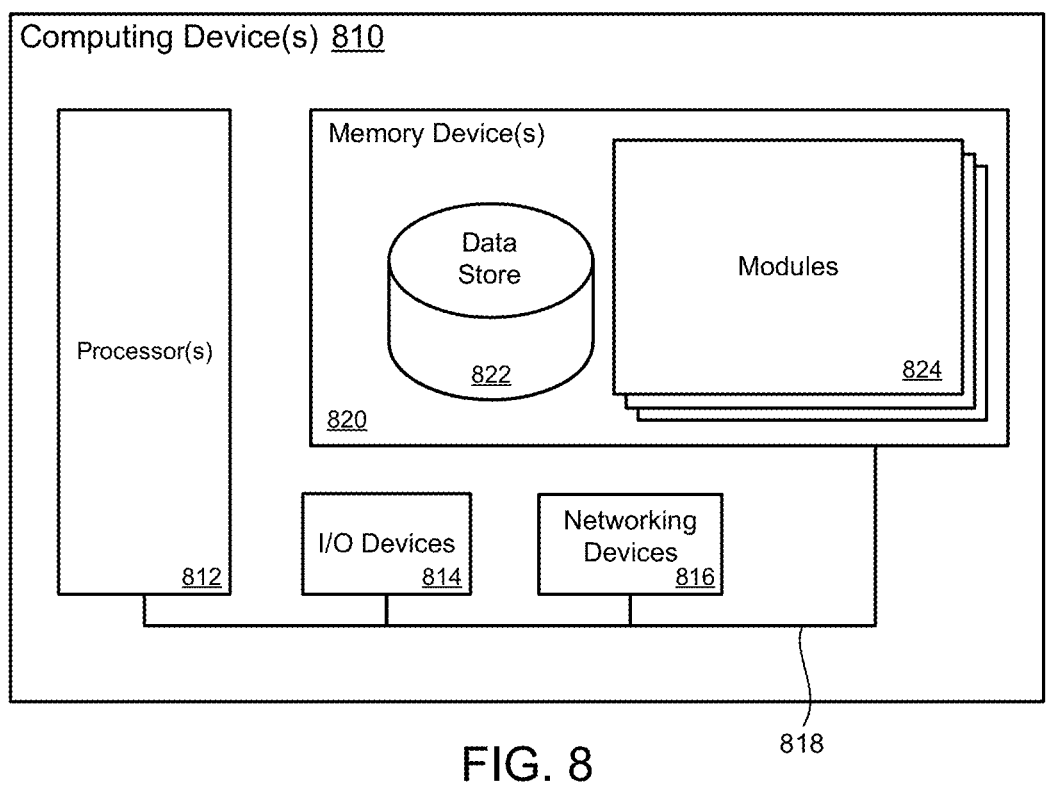
FIG. 8 is block diagram illustrating an example of a computing device that may be used to execute a method for correlating external events to application performance.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device 810. For example, the local communication interface 818 may be a local data bus and/or any related address or control busses as may be desired.

The memory device 820 may contain modules 824 that are executable by the processor(s) 812 and data for the modules 824. In one example, the memory device 820 may include an event logging service module, a multi-streaming data module, an automated machine-learning module, a log analytics module, a predictive analytics module, and other modules. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description may be implemented in the form of software using high-level programming languages that are compiled, interpreted or executed using a hybrid of the methods.

The computing device 810 may also have access to I/O (input/output) devices 814 that are usable by the computing device 810. Networking devices 816 and similar communication devices may be included in the computing device 810. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local communication interface 818 may be used as a network to facilitate communication between any of the multiple processors and multiple memories. The local communication interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for correlating application performance to external event types, comprising:
    at least one processor; and
    a memory device including executable instructions that, when executed by the at least one processor, cause the system to:
        obtain electronic content from an electronic content provider that publishes the electronic content to an Internet, wherein the electronic content contains a reference to an external event that impacts performance of an application;
        extract the reference and a time period associated with the reference from the electronic content;
        classify the reference as being associated with an external event type using a first machine learning model trained to associate references to a plurality of external events;
        generate an external event log to include event data for the external event type and the time period associated with the reference to the external event type;
        generate a set of external event metrics from the event data in the external event log;
        store the set of external event metrics to the external event log in association with the event data to make the set of external event metrics available for filtering, by customer request, of the external event log;
        determine, using the set of external event metrics generated from the external event log, a correlation of the plurality of external events to a rise or fall in performance of the application; and
        based on the correlation to the rise or fall in the performance of the application, send a notification of a predicted impact of a future external event on the application performance.

2. The system as in claim 1, wherein the memory device further includes instructions that, when executed by the at least one processor, cause the system to receive a customer selection of the electronic content to obtain from the electronic content provider.

3. The system as in claim 1, wherein the memory device further includes instructions that, when executed by the at least one processor, cause the system to:
    receive a filter parameter for identifying external event logs;
    identify a set of external event logs that correspond to the filter parameter; and
    overlay the external event metrics from the set of external event logs on computing performance metrics to allow the external event metrics to be viewed in relation to the computing performance metrics.

4. The system as in claim 1, wherein the memory device further includes instructions that, when executed by the at least one processor, cause the system to:
    provide a training dataset of the electronic content to an automated machine-learning service; and
    cause the automated machine-learning service to:
        label the electronic content; and
        train the first machine learning model using the labeled electronic content.

5. A computer implemented method, comprising: obtaining electronic content from a content server associated with an electronic content provider, wherein the electronic content contains a reference to an external event that impacts performance of an application hosted on computing resources;
    extracting the reference from the electronic content;
    identifying the reference as being associated with an external event type using a categorization technique to associate the reference in the electronic content with one or more external event types;
    generating an external event log to include event data for the external event type;
    processing the electronic content to generate an electronic content dataset that has a structured data format to allow the reference to the external event type contained in the electronic content to be identified, wherein the structured data format is determined, at least in part, according to a monitoring profile derived from customer specifications including references to external events;
    generating a set of external event metrics, based on the event data;
    correlating, using the external event metrics, the external event type to a rise or fall in performance of the application; and
    based on the correlation, proactively scaling a set of computing resources allocated for the application.

6. The method as in claim 5, further comprising overlaying external event metrics obtained from the external event log on computing performance metrics obtained from a computing resource log to allow the external event metrics to be viewed in relation to computing performance data associated with the computing resources of a customer.

7. The method as in claim 5, further comprising:
    predicting an impact of an imminent external event of the external event type on the performance of the application hosted on the computing resources using the event data contained in the external event log; and
    scaling the computing resources used to host the application based in part on the predicted impact of the imminent external event on the performance of the application.

8. The method as in claim 5, wherein obtaining the electronic content further comprises obtaining at least one of:
    news articles from news content servers,
    social media postings from social network servers,
    discussion forum postings from discussion content servers, or
    blog postings from blog content servers.

9. The method as in claim 5, wherein obtaining the electronic content further comprises obtaining an electronic content stream from a multi-streaming data service that provides the electronic content stream in parallel to multiple subscribing instances of an event logging service.

10. The method as in claim 5, further comprising converting the electronic content to a structured data format that allows identification of the reference to the external event type in the electronic content.

11. The method as in claim 5, further comprising providing a training dataset of electronic content with training labels to an automated machine-learning service in order to train a machine learning model using the training dataset.

12. The method as in claim 5, further comprising generating external event metrics from the event data in the external event log; and displaying the external event metrics as data points in a metric visualization.

13. The method as in claim 12, further comprising overlaying the data points on computing performance data obtained from a computing resource log associated with the computing resources of a customer to allow the external event metrics to be viewed in relation to the computing performance data.

14. The method as in claim 13, further comprising:
receiving a filter parameter, defined by request of the customer, for the external event metrics associated with the external event type; and
displaying the event data, obtained from the external event log, that correspond to the filter parameter with the computing performance data to allow the event data to be viewed in relation to the computing performance data.

15. The method as in claim 5, further comprising:
generating a computing performance graph using computing performance data obtained from a computing resource log associated with the computing resources of a customer; and
annotating the computing performance graph to indicate an occurrence of the external event type in relation to computing performance of the computing resources.

16. The method as in claim 5, further comprising:
generating a computing performance graph showing computing performance metrics obtained from computing resource logs associated with the computing resources of a customer;
generating an external event graph showing external event metrics from the external event log; and
displaying the computing performance graph adjacent to the external event graph to allow comparison of the external event metrics to the computing performance metrics.

17. A system, comprising:
at least one processor; and
a memory device including instructions that, when executed by the at least one processor, cause the system to:
receive a customer selection of electronic content containing a reference to an external event that impacts performance of an application hosted on computing resources;
obtain the electronic content from an electronic content provider that makes the electronic content available over one or more computer networks;
identify the reference to the external event and a time period associated with the reference in the electronic content;
classify the reference as being associated with an external event type using a machine learning model trained to associate the reference and the time period with the external event type;
process the electronic content to generate an electronic content dataset that has a structured data format to allow the reference to the external event type contained in the electronic content to be identified, wherein the structured data format is determined, at least in part, according to a monitoring profile derived from customer specifications including references to external events;
generate an event log to include event data for the external event type;
correlate, using a set of external event metrics generated from the event log, the external event to a rise or fall in the performance of the application hosted on the computing resources; and
based on the correlation, proactively scale a set of computing resources allocated for the application.

18. The system as in claim 17, wherein the memory device further includes instructions that, when executed by the at least one processor, cause the system to predict an impact of the external event type on the performance of the application hosted on the computing resources using the event data contained in the event log.

19. The system as in claim 18, wherein the memory device further includes instructions that, when executed by the at least one processor, cause the system to scale the computing resources used to host the application based in part on the predicted impact of an imminent external event of the external event type on the performance of the application.

* * * * *